INVENTOR
August Winsel

United States Patent Office 3,560,268
Patented Feb. 2, 1971

3,560,268
DEVICE FOR MEASURING ELECTROLYTE
CONCENTRATION
August Winsel, Kelkheim, Germany, assignor to Varta
Aktiengesellschaft, Frankfurt am Main, Germany
Filed Sept. 30, 1968, Ser. No. 763,767
Claims priority, application Germany, Nov. 20, 1967,
V 34,862
Int. Cl. H01m 45/06
U.S. Cl. 136—182                                    3 Claims

ABSTRACT OF THE DISCLOSURE

Bi-plastic strips for measuring the concentration of electrolyte in galvanic cells are formed from a strip of ion exchange material which swells in the electrolyte and a strip of a second material which is stable in the electrolyte and has a low bending moment. The two strips are used in a back-to-back relation with one end of the strip immobile and one end mobile.

---

This invention relates to the field of electrolytes and in particular to electrolytes which are employed in galvanic cells.

In an electrolyte system which employs aqueous electrolyte therein, water may be taken out of the system by being evaporated or decomposed, or water may be generated in the system as a by-product of an electrochemical reaction, thus changing the concentration of the electrolyte. Various procedures have been proposed whereby the electrolyte concentration in the total volume of electrolyte liquid can be determined.

According to one process, the electrolyte concentration is measured by the specific weight of the electrolyte liquid with an aerometer. This process, however, requires that the measurements are to be taken on a stable platform or base so that it cannot be used, for example, on moving vehicles.

The electrolyte concentration can also be determined by measuring the conductivity of the electrolyte. A disadvantage of this process, however, is the fact that it requires the use of electrical power.

The dependability of devices which are to be used for measuring the concentration of electrolyte, and in which the electrolyte measuring devices must be employed in direct contact with the electrolyte liquid, is impaired by the corrosive effect of the electrolyte liquid on such devices.

French Pat. 1,542,798 points out that ion exchange materials known in commerce have the property of expanding as a function of the concentration of the electrolytic solution. The use of this characteristic in the French patent is quite different from its use in the present invention.

The object of this present invention is to provide a device with which the concentration of electrolyte may be readily and simply ascertained with the assurance of great dependability and without the disadvantages of the prior art devices.

The essence of the present invention resides in the use, as a device for measuring the concentration of electrolyte, of a strip of swellable ion exchange material to one surface of which there is firmly attached a strip of material having swelling properties that are different from that of the ion exchange material and which has a low bending moment.

Figure 1:
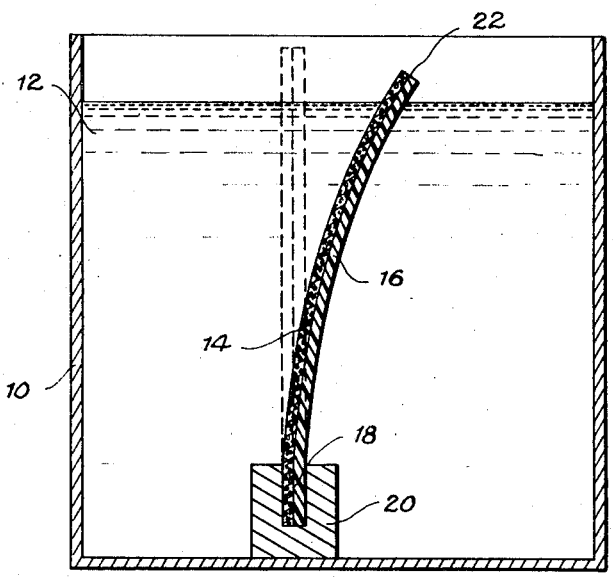
Figure 2:
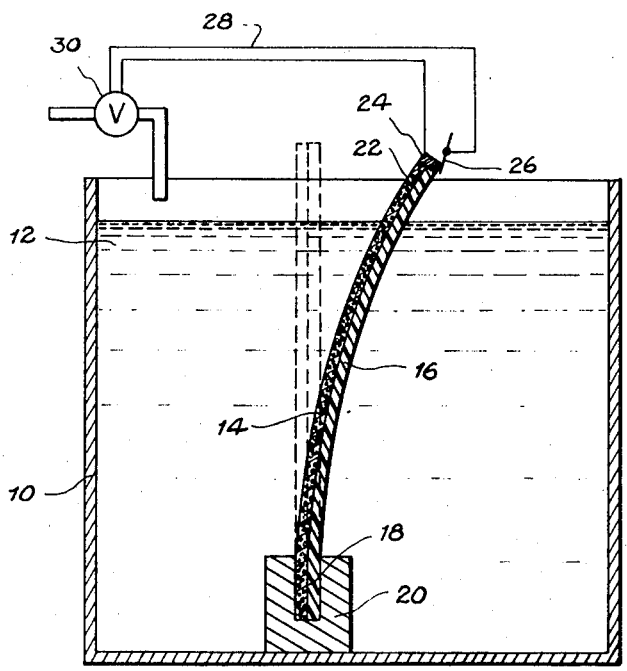

The means by which the objects of this invention are obtained are described more fully with reference to the accompanying schematic drawings, in which:

FIG. 1 is a side view of a strip-shaped device of this invention in an electrolyte container; and FIG. 2 is a similar view of a modification of the device of FIG. 1 and which includes a magnet.

As shown in FIG. 1, a container 10 holds the electrolyte 12. The bi-plastic device of this invention is composed of a strip 14 of ion exchange material which swells when wetted by the electrolyte which is bonded to a strip 16 of a different material which is resistant to swelling when wetted. An end portion 18 is anchored in a block 20, while the other end portion 22 is displaceable by the bending of the device.

In the modification of FIG. 2, the free end portion of the bi-plastic element holds a magnet 24. When the device bends, magnet 24 contacts reed switch 26 to energize an electric circuit 28 connected to valve means 30 for introducing liquid into container 10.

It has now been found that particularly advantageous results can be obtained in measuring electrolyte concentrations if there is used as the measuring device a bi-plastic member which comprises, firmly connected together in back-to-back relationship, a strip of ion exchange material and a strip of a second material which has a low or slight bending moment and which has different swelling properties from that of the ion exchange material. This composit strip-shaped bi-plastic member is bent by the longitudinal changes suffered by the strip of ion exchange material, when the ion exchange material comes in contact with the liquid electrolyte. This bending phenomenon is silmiar to that experienced by a bi-metallic strip when the latter is used to measure temperature. By this procedure, the bi-plastic member, which has one end free in the electrolyte, can be used to advantage for indicating changes in the concentration of the electrolyte since the member itself acts directly as a pointer or needle type indicator. The bi-plastic member, however, can also be used in a suitable device for operating a sliding switch for regulating the concentration of the electrolyte.

In such a device for regulating the concentration of the electrolyte, there may be attached, for example, a small magnet to the free end of the strip-shaped bi-plastic body. Then, when the concentration of the electrolyte goes beyond a certain predetermined value, the magnet is moved by the bending of the bi-plastic strip in the vicinity of a reed contact which is actuated by the magnet.

In preparing the bi-plastic members of the present invention, the plastic which is to be firmly attached, in a back-to-back relation, with the strip of ion exchange material should be a material which is stable in the electrolyte liquid, the concentration of which is to be measured, and such plastic should also have sufficient stretching properties in order to be able to absorb the forces which arise with changes in the dimensions of the strip of ion exchange material and to allow for a bending of the entire bi-plastic strip. The ion exchange material and the electrolyte stable plastic can be joined together to form the bi-plastic strips by, for example, adhesively bonding them together, or by sintering them together or by rolling or calendering together.

The following example is merely illustrative of the present invention and is not intended as a limitation upon the scope thereof.

A strip of Permutit C 20 ion exchange material measuring 8 x 0.5 x 0.1 cm. was firmly bonded, using epoxy resin as the bonding agent, to a strip of polyvinyl chloride measuring 8 x 0.5 x 0.01 cm. As shown in FIG. 1, one end of the bi-plastic strip was then held fast or immobile in a clamp and the other end was allowed to move freely and the strip was then placed in the electrolyte container of a fuel cell battery in such a way that deflections of the free end of the thus formed strip could be observed visually. The electrolyte employed was aqueous potassium hydroxide. The temperature of the electrolyte was 50° C. and the concentration of the electrolyte varied, during the test, between 4.5 normal and 6 normal. A deflection of the free end of the bi-plastic strip of about 45° was thus observed due to the differences in swelling in the ion exchange material in the different electrolyte concentrations.

In the device shown in FIG. 2, a small magnet is inserted in the tip of the mobile or free end of the bi-plastic strip and as the free end of strip is deflected by changes in the concentration of the electrolyte the moving magnet causes a reed contact, or other suitable device, not shown, to move and thus actuate valves for supplying or removing, as needed, fresh electrolyte to the electrolyte chamber of the fuel cell battery.

The ion exchange materials which can be employed in the devices of the present invention include all the commercially available ion exchange materials. The degree of swelling of these ion exchange materials is dependent upon the concentration of the electrolyte solution. One type of ion exchange material which may be used in this regard is the Permaplex materials which are sold by Firma Permutit-Aktiengesellschaft of Berlin, Germany. These ion exchange membranes experience a change in length of about 4% when the membrane is first swollen in water and then in 6 normal aqueous potassium hydroxide. These membranes undergo a shortening in length of about 2% when the membrane is first swollen in 3 normal aqueous potassium hydroxide and then in 6 normal aqueous potassium hydroxide.

The bi-plastic devices of the present invention are particularly useful in aqueous electrolytes such as potassium hydroxide, other alkali hydroxide solutions, carbonate solutions, hydrogen chloride, other acid solutions, salt solutions, e.g., all solutions, in which a change in water vapor pressure occurs.

The stable plastic materials which may be employed include polyvinyl chloride, polyethylene, polypropylene and other resin materials, for example.

By "stable" it is means that the plastic will not swell or dissolve in, or be otherwise attacked by, to any noticeable extent, the electrolyte in which the devices of this invention are to be employed.

Having now described the means by which the objects of this invention are obtained, I claim:

1. In combination with a galvanic cell which employs aqueous electrolyte therein, a device for measuring the concentration of said electrolyte which comprises a composite bi-plastic member comprising, in back-to-back relation, a strip of polymeric ion exchange material which is swellable in said electrolyte and a strip of polymeric resin which is stable in said electrolyte and has a low bending moment, and said device being mounted in the electrolyte in said cell so that one end of said device is immobile and one end movable.

2. A combination as in claim 1 in which said device further comprises a magnet at the movable end thereof.

3. A combination as in claim 2 in which said galvanic cell further comprises electrolyte valve actuating means adapted to actuate said valve in response to movements of said magnet.

References Cited

FOREIGN PATENTS 1,542,798  9/1968  France.

WINSTON A. DOUGLAS, Primary Examiner

A. SKAPARS, Assistant Examiner